US012456407B2

(12) United States Patent
Kim et al.

(10) Patent No.: US 12,456,407 B2
(45) Date of Patent: Oct. 28, 2025

(54) LUMINANCE COMPENSATION METHOD FOR DISPLAY DEVICE

(71) Applicant: Samsung Display Co., LTD., Yongin-si (KR)

(72) Inventors: Dongin Kim, Yongin-si (KR); Kang-Min Kim, Yongin-si (KR); Byoungchel Kim, Yongin-si (KR); Jahun Koo, Yongin-si (KR); Bongim Park, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 59 days.

(21) Appl. No.: 18/205,183

(22) Filed: Jun. 2, 2023

(65) Prior Publication Data

US 2024/0135851 A1 Apr. 25, 2024

(30) Foreign Application Priority Data

Oct. 18, 2022 (KR) ........................ 10-2022-0133762

(51) Int. Cl.
*G09G 3/20* (2006.01)

(52) U.S. Cl.
CPC ... *G09G 3/2003* (2013.01); *G09G 2320/0233* (2013.01); *G09G 2320/0242* (2013.01); *G09G 2320/0276* (2013.01); *G09G 2320/0666* (2013.01); *G09G 2360/16* (2013.01)

(58) Field of Classification Search
CPC ......... G09G 3/2003; G09G 2320/0233; G09G 2320/0242; G09G 2320/0276; G09G 2320/0666; G09G 2360/16
See application file for complete search history.

(56) References Cited

U.S. PATENT DOCUMENTS 6,608,614 B1 * 8/2003 Johnson ................. H05B 45/20 362/97.3
7,227,519 B1 * 6/2007 Kawase ............... G09G 3/2081 345/77
9,165,495 B2 * 10/2015 Tsuei ................... G09G 3/3413
11,908,370 B2 * 2/2024 Park ......................... G09G 3/20
2005/0116917 A1 * 6/2005 Aoki .................... G09G 3/3688 345/99

(Continued)

FOREIGN PATENT DOCUMENTS

KR 100579883 B1 5/2006
KR 101981677 B1 8/2019

(Continued)

*Primary Examiner* — Ke Xiao
*Assistant Examiner* — Jennifer L Zubajlo
(74) *Attorney, Agent, or Firm* — CANTOR COLBURN LLP

(57) ABSTRACT

A luminance compensation method for a display device includes measuring a luminance of each of white grayscale values, measuring an actual luminance value for each of colors, determining a target luminance value for each of the colors based on the luminance of each of the white grayscale values and a luminance contribution ratio of each of the colors, determining a luminance compensation amount for each of the colors based on the target luminance value and the actual luminance value, and compensating for input image data for each of the colors based on the luminance compensation amount.

20 Claims, 19 Drawing Sheets

| | Color | TL |
|---|---|---|
| ① | Red | (LW) X (LRATIO_R) |
| ② | Green | (LW) X (LRATIO_G) |
| ③ | Blue | (LW) X (LRATIO_B) |
| ④ | Yellow (R+G) | ① + ② |
| ⑤ | Megenta (R+B) | ① + ③ |
| ⑥ | Cyan (G+B) | ② + ③ |

(56) References Cited

U.S. PATENT DOCUMENTS

| | | | | |
|---|---|---|---|---|
| 2006/0071940 | A1* | 4/2006 | Ouchi | H04N 9/3179 345/600 |
| 2006/0152468 | A1* | 7/2006 | Ozaki | G09G 3/32 345/102 |
| 2007/0103706 | A1* | 5/2007 | Bing | H04N 9/64 358/1.9 |
| 2010/0271409 | A1* | 10/2010 | Makino | G09G 3/291 345/690 |
| 2013/0135272 | A1* | 5/2013 | Park | G09G 3/3233 345/211 |
| 2013/0155120 | A1* | 6/2013 | Kang | H04N 9/73 345/690 |
| 2015/0161941 | A1* | 6/2015 | Lim | G09G 3/3208 345/691 |
| 2017/0069273 | A1* | 3/2017 | Park | G09G 3/3233 |
| 2017/0162094 | A1* | 6/2017 | Jee | G09G 3/006 |
| 2018/0059458 | A1* | 3/2018 | Chen | G02F 1/133308 |
| 2020/0126497 | A1* | 4/2020 | Wang | G09G 5/10 |
| 2020/0212137 | A1* | 7/2020 | Wang | H10K 59/1213 |
| 2020/0219433 | A1* | 7/2020 | Yim | G09G 5/026 |
| 2021/0013283 | A1* | 1/2021 | Liu | H10K 59/35 |
| 2021/0065633 | A1* | 3/2021 | Li | G09G 3/3225 |
| 2021/0166606 | A1* | 6/2021 | Han | G09G 3/006 |
| 2021/0383736 | A1* | 12/2021 | Hong | G09G 3/3233 |
| 2021/0398494 | A1* | 12/2021 | Kwon | G09G 3/3291 |
| 2022/0076621 | A1* | 3/2022 | Seo | H10K 59/38 |
| 2022/0172664 | A1* | 6/2022 | Park | G09G 3/2074 |
| 2022/0198977 | A1* | 6/2022 | Kim | G09G 3/20 |
| 2023/0316978 | A1* | 10/2023 | Park | G09G 3/2007 345/690 |
| 2023/0326426 | A1* | 10/2023 | Park | G09G 5/06 |

FOREIGN PATENT DOCUMENTS

| | | | |
|---|---|---|---|
| KR | 1020200105593 | A | 9/2020 |
| KR | 1020220058770 | A | 5/2022 |
| KR | 1020220096395 | A | 7/2022 |

* cited by examiner

FIG. 7

| | Color | TL |
|---|---|---|
| ① | Red | (LW) X (LRATIO_R) |
| ② | Green | (LW) X (LRATIO_G) |
| ③ | Blue | (LW) X (LRATIO_B) |
| ④ | Yellow (R+G) | ① + ② |
| ⑤ | Megenta (R+B) | ① + ③ |
| ⑥ | Cyan (G+B) | ② + ③ |

FIG. 11

CLUT

| Grayscale | VCODE | | | | | |
|---|---|---|---|---|---|---|
| | Red | Green | Blue | Yellow | Magenta | Cyan |
| 0 | 0 | 0 | 0 | 0 | 0 | 0 |
| 1 | 16 | 10 | 40 | 13 | 28 | 25 |
| 2 | 15 | 9 | 38 | 12 | 26 | 23 |
| ... | ... | ... | ... | ... | ... | ... |
| 255 | 2 | 1 | 4 | 1 | 3 | 2 |

LUMINANCE COMPENSATION METHOD FOR DISPLAY DEVICE

This application claims priority to Korean Patent Application No. 10-2022-0133762, filed on Oct. 18, 2022, and all the benefits accruing therefrom under 35 U.S.C. § 119, the content of which in its entirety is herein incorporated by reference.

BACKGROUND

1. Field

Embodiments of the invention relate to a luminance compensation method for a display device. More particularly, embodiments of the invention relate to a luminance compensation method for a display device compensating for each of colors.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

SUMMARY

A display device may display various colors by adjusting ratios of a red color, a green color, and a blue color. In such a display device, when the ratios of the red color, the green color, and the blue color are the same as each other, a white color may be displayed. However, due to leakage characteristics of the display panel, a luminance when displaying the white color may be different from the sum of luminances when displaying the red color, the green color, and the blue color. In addition, since the leakage characteristics of the display panel for the red color, the green color, and the blue color may be different for each grayscale value, color coordinates of mixed colors (e.g., the white color, a yellow color, a magenta color, a cyan color, etc.) may be different for each grayscale value.

Embodiments of the invention provide a luminance compensation method for a display device that compensates for a luminance by a difference between a target luminance value and an actual luminance value.

According to embodiments of the invention, a luminance compensation method for a display device includes measuring a luminance of each of white grayscale values, measuring an actual luminance value for each of colors, determining a target luminance value for each of the colors based on the luminance of each of the white grayscale values and a luminance contribution ratio of each of the colors, determining a luminance compensation amount for each of the colors based on the target luminance value and the actual luminance value, and compensating for input image data for each of the colors based on the luminance compensation amount.

In an embodiment, the target luminance value for a red color may be calculated by multiplying the luminance of each of the white grayscale values by the luminance contribution ratio of the red color, the target luminance value for a green color may be calculated by multiplying the luminance of each of the white grayscale values by the luminance contribution ratio of the green color, and the target luminance value for a blue color may be calculated by multiplying the luminance of each of the white grayscale values by the luminance contribution ratio of the blue color.

In an embodiment, the target luminance value for a yellow color may be calculated by adding the target luminance value for the green color and the target luminance value for the red color, the target luminance value for a magenta color may be calculated by adding the target luminance value for the blue color and the target luminance value for the red color, the target luminance value for a cyan color may be calculated by adding the target luminance value for the blue color and the target luminance value for the green color.

In an embodiment, the luminance compensation amount for each of the colors may be calculated by subtracting the actual luminance value from the target luminance value.

In an embodiment, the compensating for the input image data may include determining a compensation voltage based on the luminance compensation amount, converting the compensation voltage into a voltage code, generating a compensation lookup table including the voltage code, and compensating the input image data based on the compensation lookup table.

In an embodiment, the measuring the luminance of each of the white grayscale values and the measuring the actual luminance values for each of the colors may be performed when at least one of color crosstalks for grayscale values is greater than a reference value.

In an embodiment, each of the color crosstalks may satisfy the following equation:

$$CCT = \frac{LW - (LR + LG + LB - 2 \times LBK)}{LW} \times 100,$$

where CCT denotes each of the color crosstalks, LW denotes the luminance of each of the white grayscale values, LR denotes a luminance of each of red grayscale values, LG denotes a luminance of each of green grayscale values, LB denotes a luminance of each of blue grayscale values, and LBK denotes a luminance of a black grayscale value.

In an embodiment, the measuring the luminance of each of the white grayscale values and the measuring of the actual luminance value of each of the colors may be performed when at least one of mixed color crosstalks for grayscale values is greater than a reference value.

In an embodiment, each of the mixed color crosstalks may satisfy the following equation:

$$MCCT = \frac{(L(A.0\sim255,\ A) - L(A.0.A)) - (L(0,\ 0\sim255,\ 0) - L(0,\ 0,\ 0)}{L(0,\ 0\sim255,\ 0)} \times 100,$$

where MCCT denotes each of the mixed color crosstalks, L(A,0~255,A) denotes a luminance of each green grayscale value when the red grayscale value is A and the blue grayscale value is A, L(A,0,A) denotes a luminance when the red grayscale value is A, the blue grayscale value is A, and the green grayscale value is 0, L(0,0~255,0) denotes a luminance of the each green grayscale value when the red grayscale value is 0 and the blue grayscale value is the 0, and L(0,0,0) denotes a luminance when the red grayscale value is 0, the blue grayscale value is 0, and the green grayscale value is 0.

In an embodiment, the measuring the luminance of each of the white grayscale values and the measuring of the actual luminance value of each of the colors may be performed when at least one of color crosstalks for grayscale values or mixed color crosstalks for the grayscale values is greater than a reference value.

According to embodiments of the invention, a luminance compensation method for a display device includes measuring a luminance of each of white grayscale values for measurement grayscale values, measuring an actual luminance value of each of the measurement grayscale values for each of colors, determining a target luminance value of each of the measurement grayscale values for each of the colors based on the luminance of each of the white grayscale values and a luminance contribution ratio of each of the colors, determining a luminance compensation amount of each of the measurement grayscale values for each of the colors based on the target luminance value and the actual luminance value, determining a luminance compensation amount of each of grayscale values other than the measurement grayscale values for each of the colors based on the luminance compensation amount of each of the measurement grayscale values, and compensating input image data for each of the colors based on the luminance compensation amount of each of the measurement grayscale values and the luminance compensation amount of each of the grayscale values other than the measurement grayscale values.

In an embodiment, the luminance compensation amount of each of the grayscale values other than the measurement grayscale values for each of the colors may be determined by interpolating the luminance compensation amount of each of the measurement grayscale values for each of the colors.

In an embodiment, the target luminance value for a red color may be calculated by multiplying the luminance of each of the white grayscale values by the luminance contribution ratio of the red color, the target luminance value for a green color may be calculated by multiplying the luminance of each of the white grayscale values by the luminance contribution ratio of the green color, and the target luminance value for a blue color may be calculated by multiplying the luminance of each of the white grayscale values by the luminance contribution ratio of the blue color.

In an embodiment, the target luminance value for a yellow color may be calculated by adding the target luminance value for the green color and the target luminance value for the red color, the target luminance value for a magenta color may be calculated by adding the target luminance value for the blue color and the target luminance value for the red color, the target luminance value for a cyan color may be calculated by adding the target luminance value for the blue color and the target luminance value for the green color.

In an embodiment, the luminance compensation amount may be calculated by subtracting the actual luminance value from the target luminance value.

According to embodiments of the invention, a luminance compensation method for a display device includes measuring a luminance of each of white grayscale values for measurement positions, measuring an actual luminance value of each of the measurement positions for each of colors, determining a target luminance value of each of the measurement positions for each of the colors based on the luminance of each of the white grayscale values and a luminance contribution ratio of each of the colors, determining a luminance compensation amount of each of the measurement positions for each of the colors based on the target luminance value and the actual luminance value, determining a luminance compensation amount of each of positions other than the measurement positions for each of the colors based on the luminance compensation amount of each of the measurement grayscale values, and compensating input image data for each of the colors based on the luminance compensation amount of each of the measurement positions and the luminance compensation amount of each of the positions other than the measurement positions.

In an embodiment, the luminance compensation amount of each of the positions other than the measurement positions for each of the colors may be determined by interpolating the luminance compensation amount of each of the measurement positions for each of the colors.

In an embodiment, the target luminance value for a red color may be calculated by multiplying the luminance of each of the white grayscale values by the luminance contribution ratio of the red color, the target luminance value for a green color may be calculated by multiplying the luminance of each of the white grayscale values by the luminance contribution ratio of the green color, and the target luminance value for a blue color may be calculated by multiplying the luminance of each of the white grayscale values by the luminance contribution ratio of the blue color.

In an embodiment, the target luminance value for a yellow color may be calculated by adding the target luminance value for the green color and the target luminance value for the red color, the target luminance value for a magenta color may be calculated by adding the target luminance value for the blue color and the target luminance value for the red color, the target luminance value for a cyan color may be calculated by adding the target luminance value for the blue color and the target luminance value for the green color.

In an embodiment, the luminance compensation amount may be calculated by subtracting the actual luminance value from the target luminance value.

In embodiments of the invention, the luminance compensation method for a display device may reduce luminance deviation and color coordinate deviation between mixed color driving and individual color driving due to leakage characteristics of a display panel by measuring a luminance of each of white grayscale values, measuring an actual luminance value for each of colors, determining a target luminance value for each of the colors based on the luminance of each of the white grayscale values and a luminance contribution ratio of each of the colors, determining a luminance compensation amount for each of the colors based on the target luminance value and the actual luminance value, and compensating for input image data for each of the colors based on the luminance compensation amount.

In embodiments of the invention, the luminance compensation method for a display device may reduce luminance deviation and color coordinate deviation between mixed color driving and individual color driving due to leakage characteristics of a display panel for each position of the display panel by measuring a luminance of each of white grayscale values for measurement positions, measuring an actual luminance value of each of the measurement positions for each of colors, determining a target luminance value of each of the measurement positions for each of the colors based on the luminance of each of the white grayscale values and a luminance contribution ratio of each of the colors, determining a luminance compensation amount of each of the measurement positions for each of the colors based on the target luminance value and the actual luminance value, determining a luminance compensation amount of each of positions other than the measurement positions for each of the colors based on the luminance compensation amount of each of the measurement grayscale values, and compensating input image data for each of the colors based on the luminance compensation amount of each of the measurement positions and the luminance compensation amount of each of the positions other than the measurement positions.

BRIEF DESCRIPTION OF THE DRAWINGS

FIG. 7 is a table illustrating an example of a target luminance value according to the luminance compensation method for the display device of FIG. 1.

FIG. 11 is a table illustrating an example of a compensation lookup table according to the luminance compensation method for the display device of FIG. 1.

DETAILED DESCRIPTION

Figure 1:
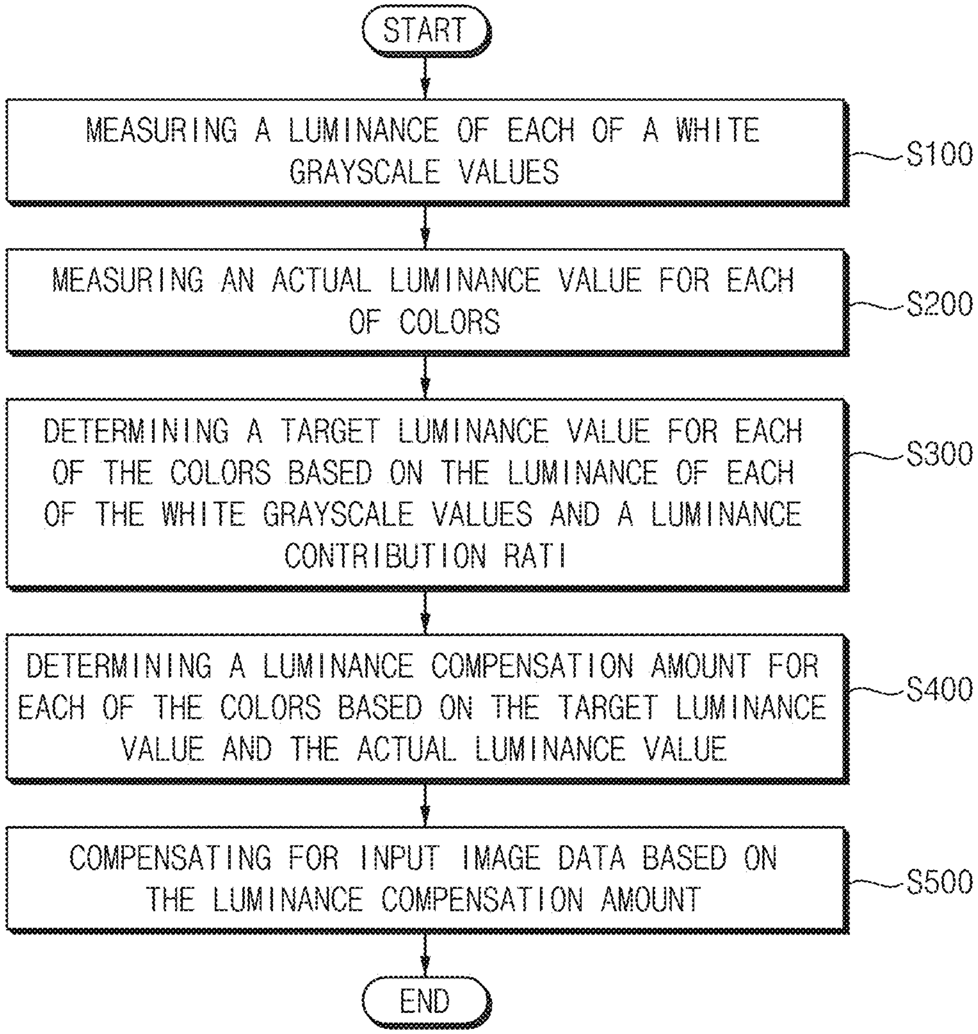
FIG. 1 is a flowchart illustrating a luminance compensation method for a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a flowchart illustrating a luminance compensation method for a display device according to embodiments of the invention.

Referring to FIG. 1, an embodiment of the luminance compensation method may include measuring a luminance of each of white grayscale values (S100), measuring an actual luminance value for each of colors (S200), determining a target luminance value for each of the colors based on the luminance of each of the white grayscale values and a luminance contribution ratio (S300), determining a luminance compensation amount for each of the colors based on the target luminance value and the actual luminance value (S400), and compensating for input image data based on the luminance compensation amount (S500). Hereinafter, the luminance compensation method will be described in greater detail with reference to FIGS. 2 to 12.

Figure 2:
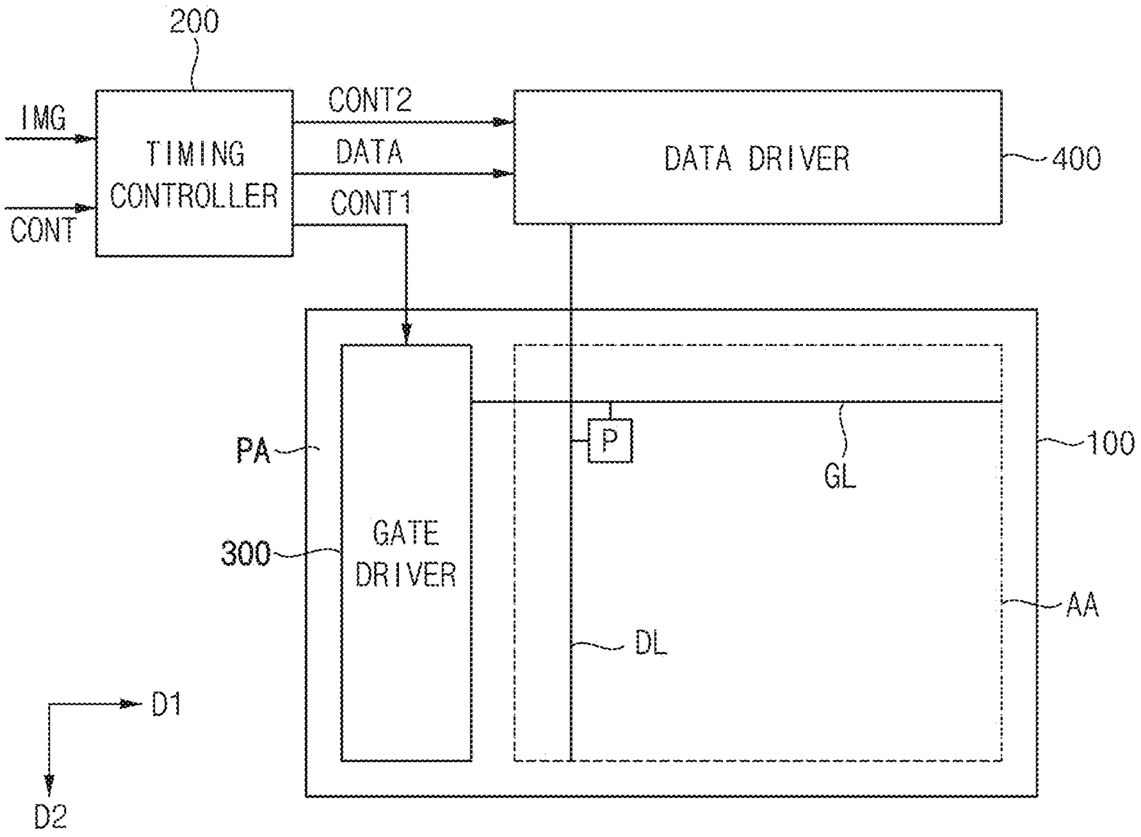
FIG. 2 is a block diagram illustrating a display device according to the luminance compensation method for the display device of FIG. 1.

FIG. 2 is a block diagram illustrating a display device according to the luminance compensation method for the display device of FIG. 1.

Referring to FIG. 2, an embodiment of the display device may include a display panel 100, a timing controller 200, a gate driver 300, and a data driver 400. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted (or formed) on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit (GPU)). In an embodiment, for example, the input image data IMG may include red image data, green image data and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

Figure 3:
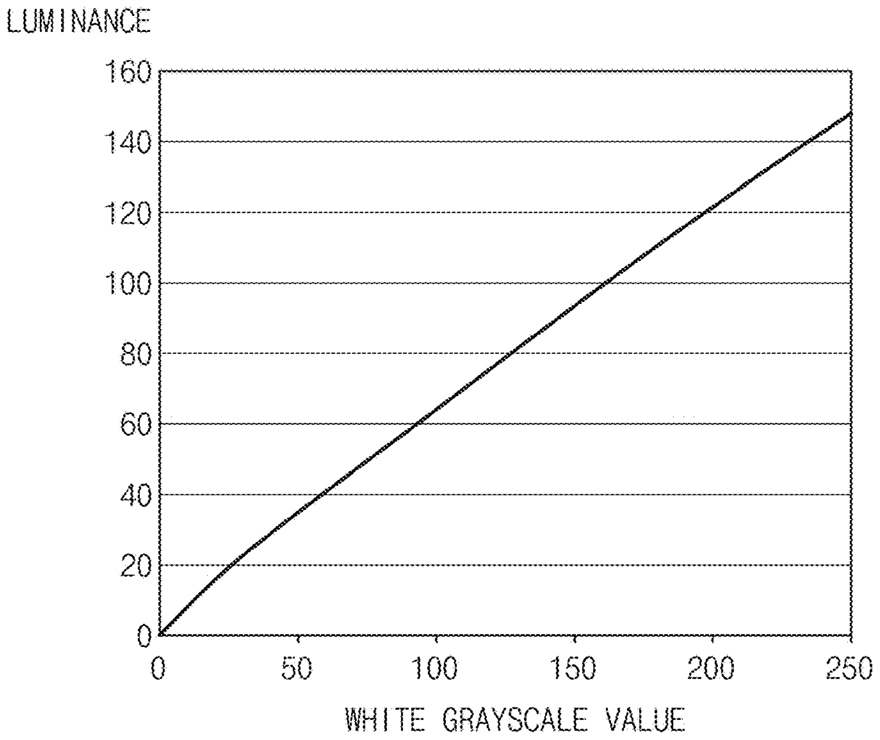
FIG. 3 is a graph illustrating an example of a luminance according to a white grayscale value before a gamma correction according to the luminance compensation method for the display device of FIG. 1.
Figure 4:
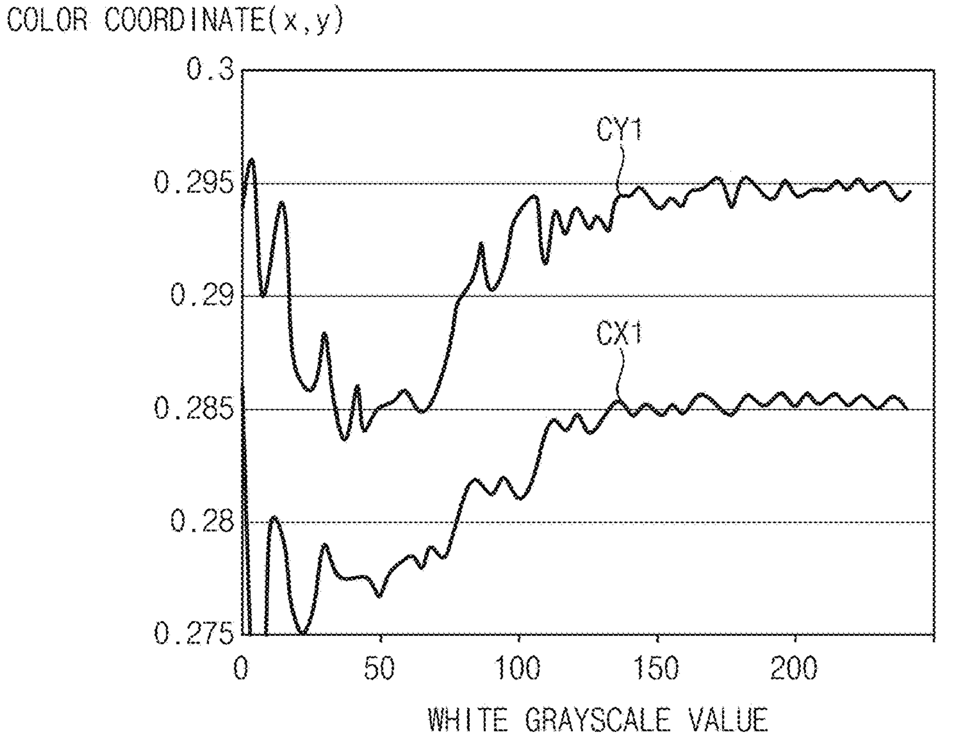
FIG. 4 is a graph illustrating an example of color coordinates according to white grayscale values before a gamma correction according to the luminance compensation method for the display device of FIG. 1.
Figure 5:
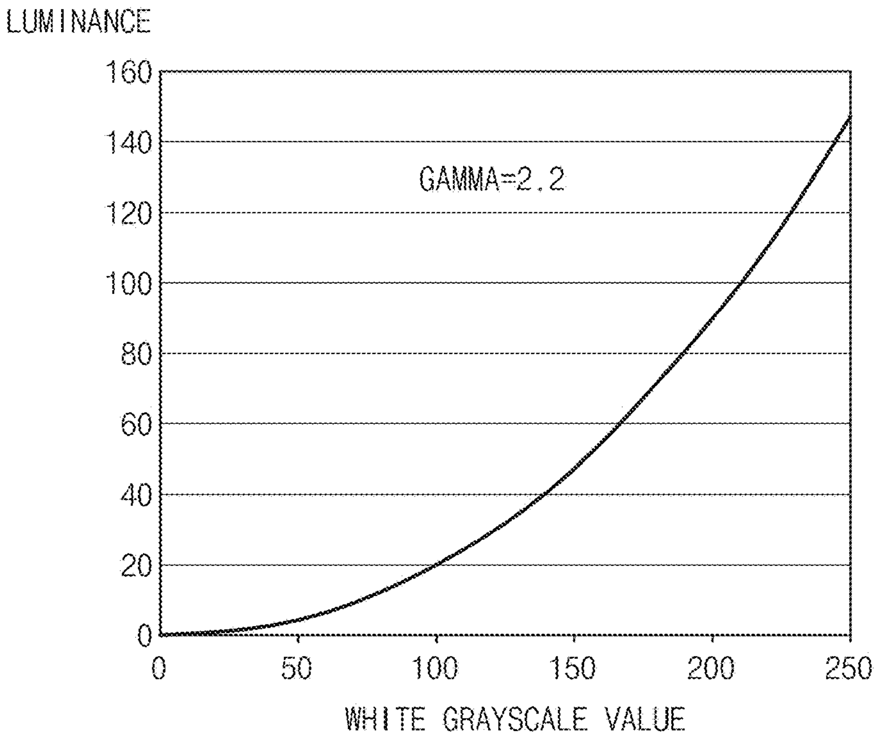
FIG. 5 is a graph illustrating an example of a luminance according to a white grayscale value after a gamma correction according to the luminance compensation method for the display device of FIG. 1.
Figure 6:
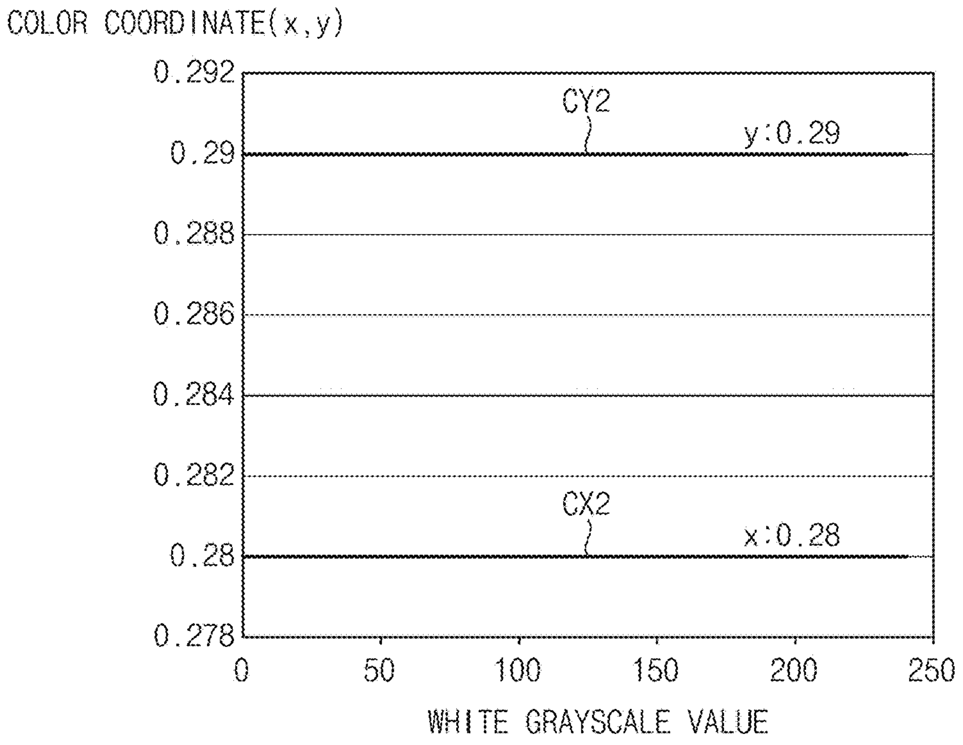
FIG. 6 is a graph illustrating an example of color coordinates according to a white grayscale value after a gamma correction according to the luminance compensation method for the display device of FIG. 1.

FIG. 3 is a graph illustrating an example of a luminance according to a white grayscale value before a gamma correction according to the luminance compensation method for the display device of FIG. 1, FIG. 4 is a graph illustrating an example of color coordinates according to white grayscale values before a gamma correction according to the luminance compensation method for the display device of FIG. 1, FIG. 5 is a graph illustrating an example of a luminance according to a white grayscale value after a gamma correction according to the luminance compensation method for the display device of FIG. 1, and FIG. 6 is a graph illustrating an example of color coordinates according to a white grayscale value after a gamma correction according to the luminance compensation method for the display device of FIG. 1. FIGS. 3 to 7 show embodiments where the number of the grayscale value of the input image data IMG is 256 ranging from 0 grayscale value to 255 grayscale value, and the gamma correction is performed based on the white grayscale value.

The white grayscale value may be a grayscale value for displaying white. That is, the white grayscale value may be a grayscale value when grayscale values of all colors are the same as each other. For example, when the display device displays 255 white grayscale value, a red grayscale value, a green grayscale value, and a blue grayscale value may have 255 grayscale value.

As shown in FIG. 3, the luminance according to the white grayscale value before the gamma correction shows a generally linear graph. That is, in FIG. 2, as the white grayscale value increases, the luminance may increase substantially linearly.

When the gamma correction is performed by setting a target gamma value to 2.2, the luminance according to the white grayscale value is a non-linear graph as shown in FIG. 4. That is, in FIG. 4, the luminance may increase nonlinearly as the white grayscale value increases.

As shown in FIG. 4, the color coordinate according to the white grayscale value do not have a constant value before the gamma correction. In FIG. 4, CX1 represents an x color coordinate, and CY1 represents a y color coordinate.

When the gamma correction is performed by setting a target color coordinate (x, y) to (0.28, 0.29), the color coordinate according to the white grayscale value may have a constant value as shown in FIG. 6. In FIG. 6, CX2 represents an x color coordinate, CY2 represents a y color coordinate, CX2 has 0.28, and CY2 has 0.29.

Figure 8:
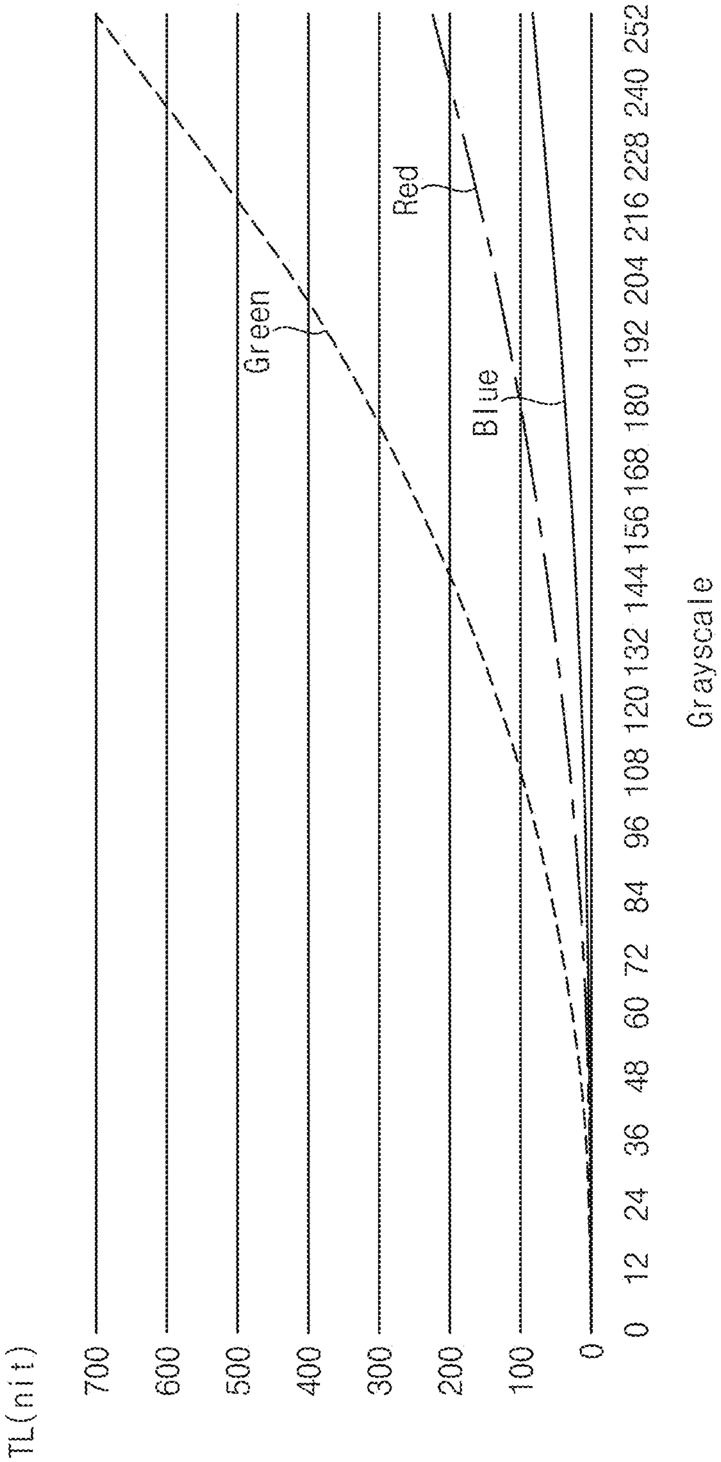
FIG. 8 is a graph illustrating an example of a target luminance value according to the luminance compensation method for the display device of FIG. 1.
Figure 9:
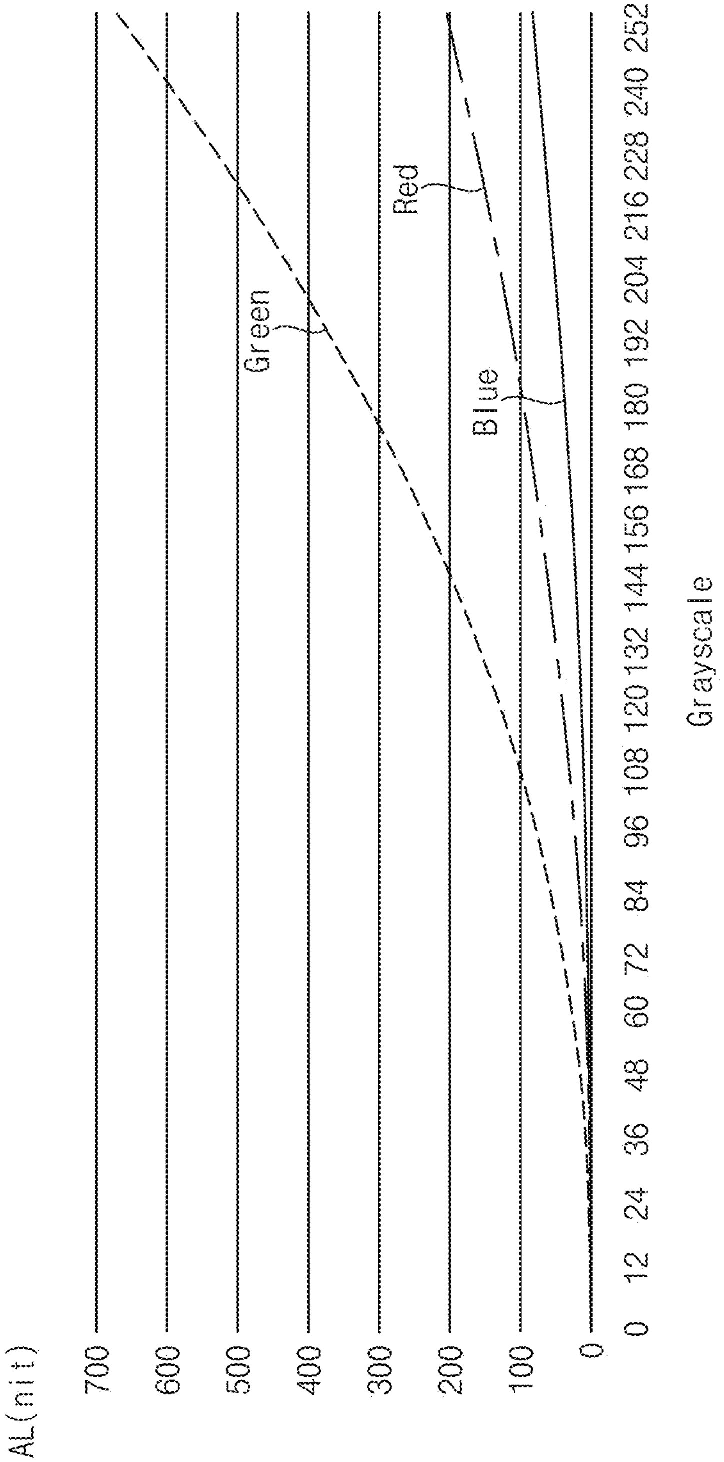
FIG. 9 is a graph illustrating an example of an actual luminance value according to the luminance compensation method for the display device of FIG. 1.
Figure 10:
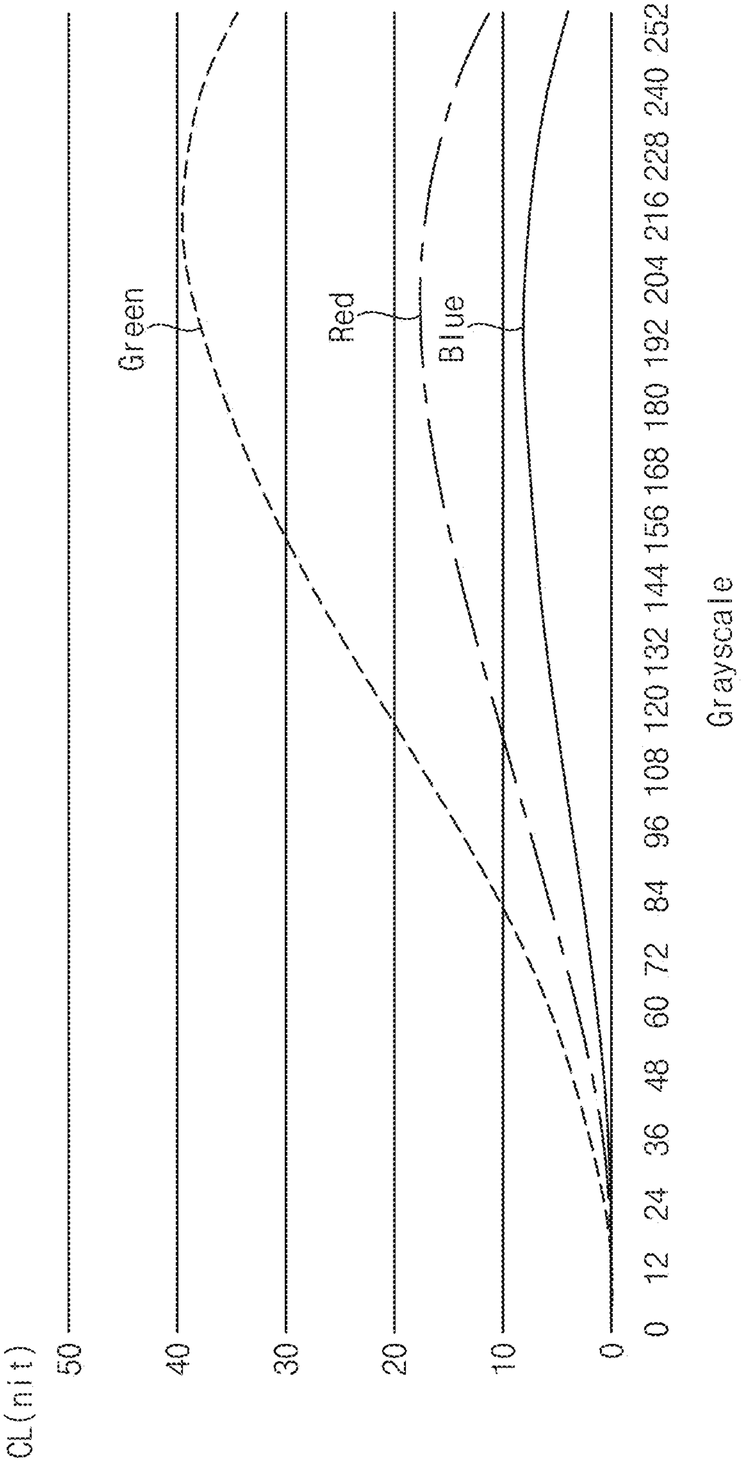
FIG. 10 is a graph illustrating an example of a luminance compensation amount according to the luminance compensation method for the display device of FIG. 1.

FIG. 7 is a table illustrating an example of a target luminance value TL according to the luminance compensation method for the display device of FIG. 1, FIG. 8 is a graph illustrating an example of the target luminance value TL according to the luminance compensation method for the display device of FIG. 1, FIG. 9 is a graph illustrating an example of an actual luminance value AL according to the luminance compensation method for the display device of FIG. 1, and FIG. 10 is a graph illustrating an example of a luminance compensation amount CL according to the luminance compensation method for the display device of FIG. 1. FIGS. 8 to 10 show the target luminance value TL, the actual luminance value AL, and the luminance compensation amount CL for a red color, a green color, and a blue color.

Referring to FIGS. 1, 7, and 8, the luminance compensation method of FIG. 1 may include measuring the luminance LW of each of the white grayscale values (S100), and determining the target luminance value TL for each of the colors based on the luminance of each of the white grayscale values LW and the luminance contribution ratio LRATIO_R, LRATIO_G, and LRATIO_B(S300).

The luminance contribution ratio LRATIO_R, LRATIO_G, and LRATIO_B may be ratios at which each of the red color, the green color, and the blue color contributes to a luminance. The luminance contribution ratio LRATIO_R, LRATIO_G, and LRATIO_B may be calculated from the gamma correction result described with reference to FIGS. 3 to 6. In an embodiment, for example, where the color coordinates of the white grayscale value are determined through the gamma correction and grayscale voltages of the red color, the green color, and the blue color for displaying the determined color coordinates of the white grayscale value are determined, the luminance contribution ratio LRATIO_R, LRATIO_G, and LRATIO_B may be calculated from the gamma correction result.

In an embodiment, the target luminance value TL for the red color may be calculated by multiplying the luminance LW of each of the white grayscale values by the luminance contribution ratio LRATIO_R of the red color, the target luminance value TL for the green color may be calculated by multiplying the luminance LW of each of the white grayscale values by the luminance contribution ratio LRATIO_G of the green color, and the target luminance value TL for the blue color may be calculated by multiplying the luminance LW of each of the white grayscale values by the luminance contribution ratio LRATIO_B of the blue color.

For example, in a case where the luminance contribution ratio of the red color LRATIO_R is 0.22, the luminance contribution ratio of the green color LRATIO_G is 0.7, the luminance contribution ratio of the blue color LRATIO_B is 0.08, and the luminance LW of 252 white grayscale value is 1000 nit (i.e., candela per square meter ($cd/m^2$)), the target luminance value TL of 252 red grayscale value may be 220 nit, the target luminance value TL of 252 green grayscale value may be 700 nit, and the target luminance values TL of 252 blue grayscale value may be 80 nit.

In an embodiment, the target luminance value TL for a yellow color may be calculated by adding the target luminance value TL for the green color and the target luminance value TL for the red color, the target luminance value TL for a magenta color may be calculated by adding the target luminance value TL for the blue color and the target luminance value TL for the red color, and the target luminance value TL for a cyan color may be calculated by adding the target luminance value TL for the blue color and the target luminance value TL for the green color.

For example, in a case where the target luminance value TL of 252 red grayscale value is 220 nit, the target luminance value TL of 252 green grayscale value is 700 nit, and the target luminance value TL of 252 blue grayscale value is 80 nit, the target luminance value TL of 252 yellow grayscale value is 920 nit, the target luminance value TL of 252 magenta grayscale value is 300 nit, and the target luminance value TL of 252 cyan grayscale value is 780 nit.

Referring to FIGS. 1 and 7 to 10, the luminance compensation method may include measuring the actual luminance value AL for each of the colors (S200). In an embodiment, for example, the luminance compensation method of the display device of FIG. 1 may measure a luminance of the red color, a luminance of the green color, the luminance of the blue color, the luminance of the yellow color, the luminance of the magenta color, and the luminance of the cyan color in each grayscale value. As shown in FIG. 9, the actual luminance value AL may be smaller than the target luminance value TL due to leakage characteristics of the display panel (100 in FIG. 2).

The luminance compensation method of FIG. 1 may include determining the luminance compensation amount CL for each of the colors based on the target luminance value TL and the actual luminance value AL(S400). In an embodiment, the luminance compensation amount CL may be calculated by subtracting the actual luminance value AL from the target luminance value TL.

For example, in a case where the target luminance value TL of 252 red grayscale value is 220 nit and the actual luminance value AL of 252 red grayscale value is 208 nit, the luminance compensation amount CL for 252 red grayscale value may be 12 nit.

In such an embodiment, as described above, the luminance compensation method of FIG. 1 may reduce luminance deviation and color coordinate deviation between mixed color (i.e., the white color, the yellow color, the magenta color, and the cyan color) driving and individual color (i.e., the red color, the green color, and the blue color) driving due to leakage characteristics of the display panel (100 in FIG. 2).

Figure 12:
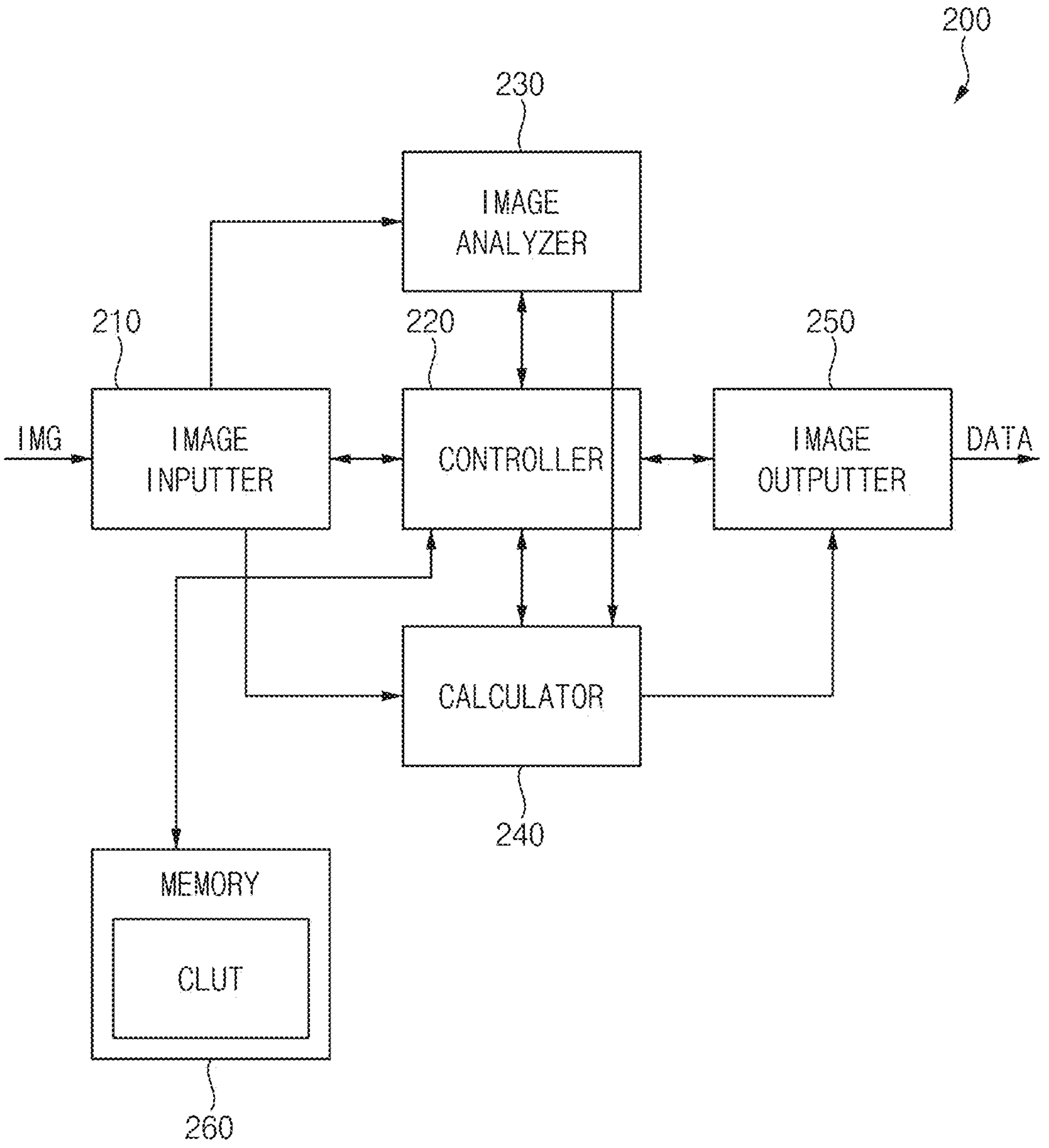
FIG. 12 is a block diagram illustrating an example of a timing controller according to the luminance compensation method for the display device of FIG. 1.

FIG. 11 is a table illustrating an example of a compensation lookup table CLUT according to the luminance compensation method for the display device of FIG. 1, and FIG. 12 is a block diagram illustrating an example of the timing controller 200 according to the luminance compensation method for the display device of FIG. 1.

Referring to FIGS. 1, 2, and 10 to 12, an embodiment of the luminance compensation method may include compensating for the input image data IMG based on the luminance compensation amount CL(S500).

In an embodiment, the luminance compensation method of FIG. 1 may include determining a compensation voltage based on the luminance compensation amount CL, converting the compensation voltage into a voltage code VCODE, generating the compensation lookup table CLUT including the voltage code VCODE, and compensating the input image data IMG based on the compensation lookup table CLUT.

In an embodiment, for example, the compensation voltage may be a voltage for increasing the luminance by the luminance compensation amount CL. The luminance compensation method of FIG. 1 may convert the compensation voltage into a form for storing or a storable form (i.e., the voltage code VCODE).

The luminance compensation amount CL may be determined based on the grayscale values and the colors. Accordingly, the voltage code VCODE may be a value for the grayscale values and the colors.

In an embodiment, as shown in FIG. 12, the timing controller 200 may include an image inputter 210, a controller 220, an image analyzer 230, a calculator 240, an image outputter 250, and a memory 260.

The image inputter 210 may receive the input image data IMG and output the input image data IMG to the image analyzer 230 and the calculator 240.

The controller 220 may read the compensation lookup table CLUT stored in the memory 260. The controller 220 may control the image inputter 210, the image analyzer 230, the calculator 240, and the image outputter 250.

The image analyzer 230 may receive the input image data IMG and analyze the grayscale values of each of the pixels P. In an embodiment, for example, the image analyzer 230 may analyze the red grayscale value, the green grayscale value, and the blue grayscale value of each of the pixels P. In an embodiment, for example, the image analyzer 230 may analyze the ratios of the red color, the green color, the blue color, and the mixed colors of each of the pixels P. The image analyzer 230 may output an analysis result to the calculator 240.

The calculator 240 may compensate for the grayscale values for each of the pixels P based on the analysis result. The calculator 240 may determine a color of the voltage code VCODE to be applied based on the ratios of the red color, the green color, the blue color, and the mixed color.

In an embodiment, for example, the calculator 240 may select at least one selected from the voltage code VCODE for the red color, the voltage code VCODE for the yellow color, and the voltage code VCODE for the magenta color corresponding to the ratios of the red color, the green color, the blue color, and the mixed color, respectively, and the calculator 240 may compensate for the red grayscale value based on the selected voltage code VCODE.

In an embodiment, for example, the calculator 240 may select at least one selected from the voltage code VCODE for the green color, the voltage code VCODE for the yellow color, and the voltage code VCODE for the cyan color corresponding to the ratios of the red color, the green color, the blue color, and the mixed color, and the calculator 240 may compensate for the green grayscale value based on the selected voltage code VCODE.

In an embodiment, for example, the calculator 240 may select at least one selected from the voltage code VCODE for the blue color, the voltage code VCODE for the magenta color, and the voltage code VCODE for the cyan color corresponding to the ratios of the red color, the green color, the blue color, and the mixed color, and the calculator 240 may compensate for the blue grayscale value based on the selected voltage code VCODE.

The image outputter 250 may receive the compensated input image data IMG from the calculator 240 and output the data signal DATA.

Figure 13:
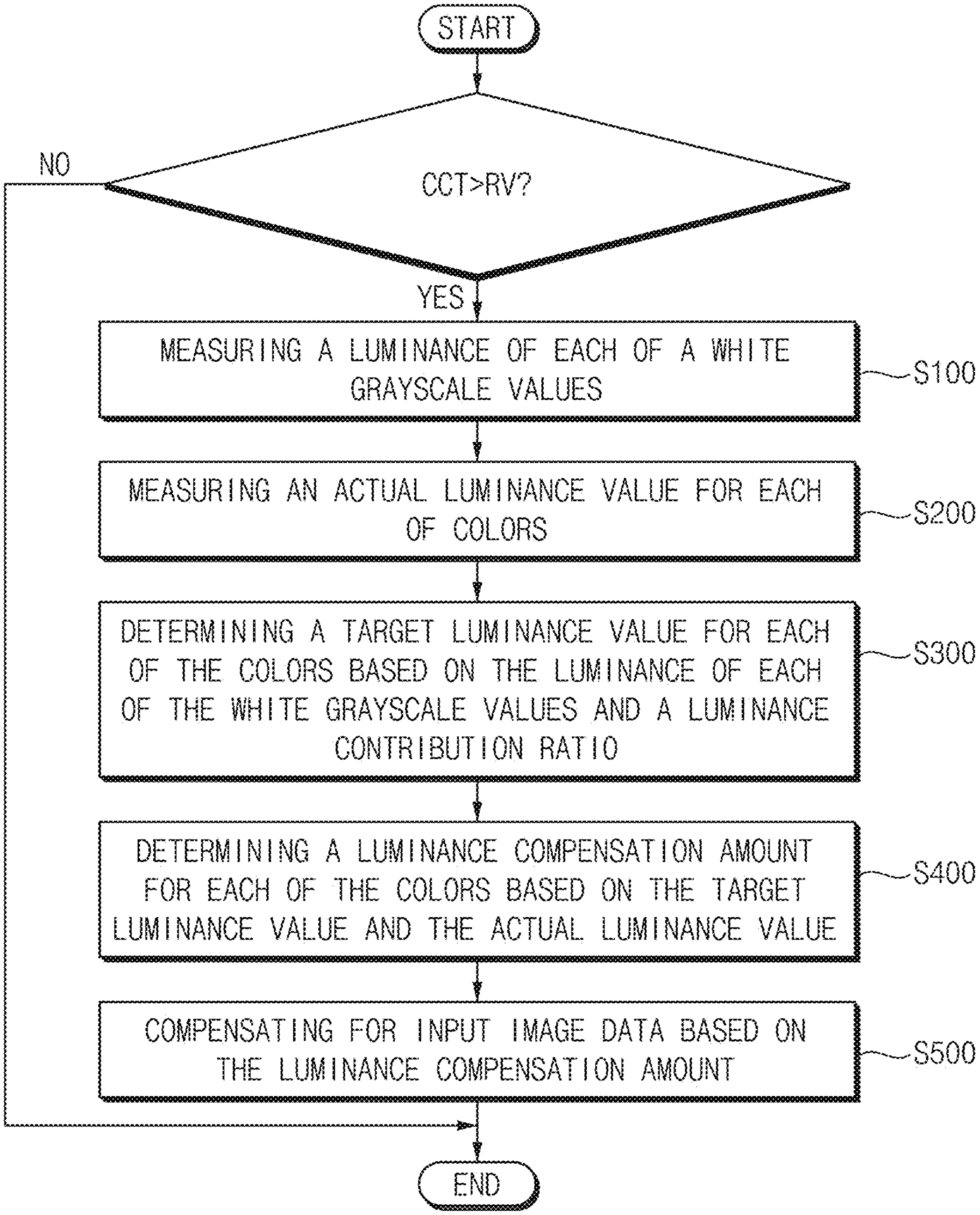
FIG. 13 is a flowchart illustrating a luminance compensation method for a display device according to embodiments of the invention.
Figure 14:
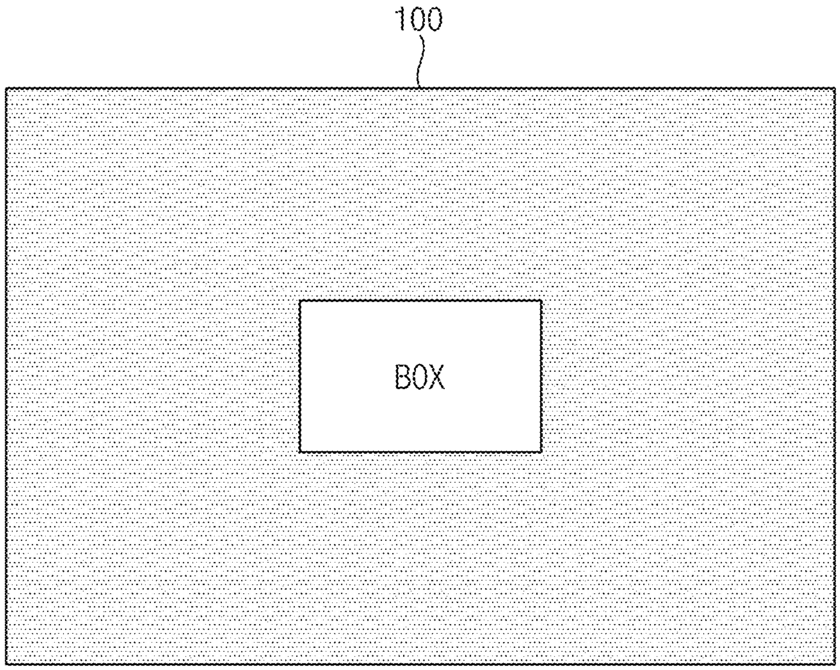
FIG. 14 is a diagram for explaining a color crosstalk or a mixed color crosstalk.
Figure 15:
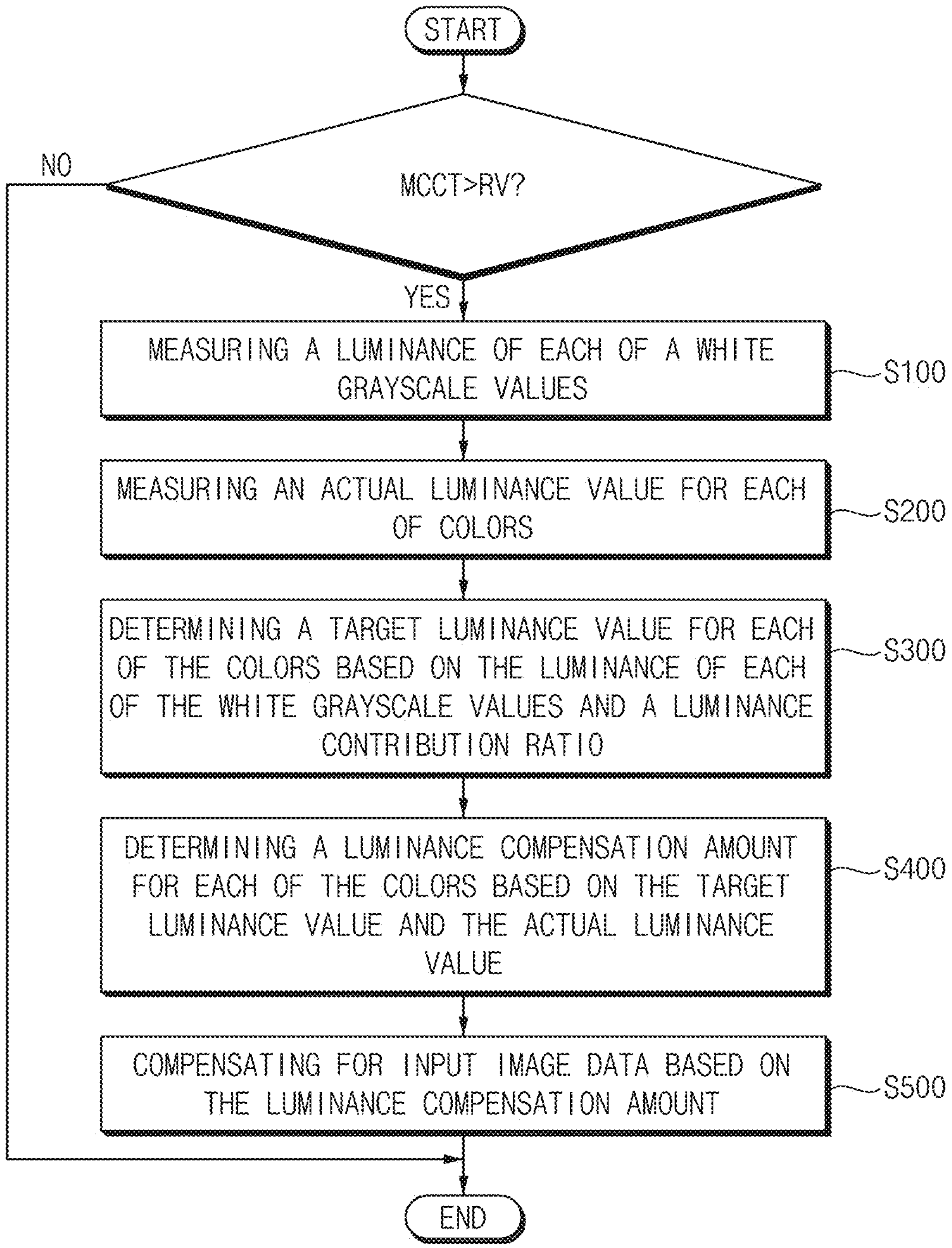
FIG. 15 is a flowchart illustrating a luminance compensation method for a display device according to embodiments of the invention.

FIG. 13 is a flowchart illustrating a luminance compensation method for a display device according to embodiments of the invention, and FIG. 14 is a diagram for explaining a color crosstalk CCT or a mixed color crosstalk (MCCT in FIG. 15).

The luminance compensation method of FIG. 13 is substantially the same as the luminance compensation method of FIG. 1 except for generating the compensation lookup table based on the color crosstalk CCT. Thus, the same reference numerals are used to refer to the same or similar element, and any repetitive detailed description thereof will be omitted.

Referring to FIGS. 2, 11, 13, and 14, in an embodiment of the luminance compensation method, measuring the luminance of each of the white grayscale values (S100) and measuring the actual luminance values for each of the colors (S200) may be performed when at least one of the color crosstalks CCT for the grayscale values is greater than a reference value. The reference value may be a preset value.

In an embodiment, for example, each of the color crosstalks CCT may be calculated by using [Equation 1]. A unit of the color crosstalk CCT may be percent (%).

$$CCT = \frac{LW - (LR + LG + LB - 2 \times LBK)}{LW} \times 100, \quad \text{[Equation 1]}$$

Here, CCT denotes each of the color crosstalks, LW denotes the luminance of each of the white grayscale values, LR denotes a luminance of each of the red grayscale values, LG denotes a luminance of each of the green grayscale values, LB denotes a luminance of each of the blue grayscale values, and LBK denotes a luminance of a black grayscale value (i.e., a grayscale value for displaying a black color).

In an embodiment, for example, as shown in FIG. 14, the luminance of each of the white grayscale values, the red grayscale values, the green grayscale values, and the blue grayscale values may be measured by displaying the white grayscale value, the red grayscale value, the green grayscale value, and the blue grayscale value on a box region BOX of the display panel 100.

In an embodiment, for example, the luminance of the black grayscale value may be measured by displaying the black grayscale value on the entire display panel 100.

In an embodiment, for example, a full white pattern may be displayed on the entire display panel 100 for a certain period before measuring the luminance of each grayscale value. The full white pattern may be a pattern in which 255 white grayscale value is displayed on the entire display panel 100.

For example, in a case where the luminance of 252 white grayscale value is 1000 nit, the luminance of 252 red grayscale value is 208 nit, the luminance of 252 green grayscale value is 650 nit, the luminance of 252 blue grayscale value is 90 nit, and the luminance of the black grayscale value is 4 nit, the color crosstalk CCT for 252 grayscale value may be 6%.

The luminance compensation method of the display device of FIG. 13 may not compensate for the input image data IMG when luminance difference between a mixed color driving and an individual color driving is not large by not generating the compensation lookup table when at least one of the color crosstalks CCT is less than or equal to the reference value.

FIG. 15 is a flowchart illustrating a luminance compensation method for a display device according to embodiments of the invention.

The luminance compensation method of FIG. 15 is substantially the same as the luminance compensation method of FIG. 1 except for generating the compensation lookup table based on the mixed color crosstalk MCCT. Thus, the same reference numerals are used to refer to the same or similar element, and any repetitive detailed description thereof will be omitted.

Referring to FIGS. 2, 11, 14, and 15, in an embodiment of the luminance compensation method, measuring the luminance of each of the white grayscale values (S100) and measuring of the actual luminance value of each of the colors (S200) may be performed when at least one of the mixed color crosstalks MCCT for grayscale values is greater than a reference value.

In an embodiment, for example, each of the mixed color crosstalks MCCT may be calculated by using [Equation 2]. A unit of the mixed color crosstalk MCCT may be percent (%).

$$MCCT = \frac{(L(A, 0\sim255, A) - L(A, 0, A)) - (L(0, 0\sim255, 0) - L(0, 0, 0)}{L(0, 0\sim255, 0)} \times 100 \quad \text{[Equation 2]}$$

Here, MCCT denotes each of the mixed color crosstalks, L(A,0~255,A) denotes a luminance of each green grayscale value when the red grayscale value is A and the blue grayscale value is A, L(A,0,A) denotes a luminance when the red grayscale value is A, the blue grayscale value is A, and the green grayscale value is 0, L(0,0~255,0) denotes a luminance of the each green grayscale value when the red grayscale value is 0 and the blue grayscale value is the 0, and L(0,0,0) denotes a luminance when the red grayscale value is 0, the blue grayscale value is 0, and the green grayscale value is 0. Luminances for calculating the mixed color crosstalk MCCT may all be measured luminances.

In an embodiment, for example, as shown in FIG. 14, the luminances for calculating the mixed color crosstalk may be measured by displaying the grayscale values on the box region BOX of the display panel 100. The box region BOX may be a preset region.

In an embodiment, for example, the full white pattern may be displayed on the entire display panel 100 for a certain period before measuring the luminance of each grayscale value. The full white pattern may be a pattern in which 255 white grayscale value is displayed on the entire display panel 100.

For example, in a case, where the luminance when the red grayscale value is 128, the green grayscale value is 255, and the blue grayscale value is 128 is 800 nit, the luminance when the red grayscale value is 128, the green grayscale value is 0, and the blue grayscale value is 128 is 150 nit, the luminance when the red grayscale value is 0, the green grayscale value is 255, and the blue grayscale value is 0 is 400 nit, and the luminance when the red grayscale value is 0, the green grayscale value is 0, and the blue grayscale value is 0 is 4 nit, the mixed color crosstalk MCCT for 255 grayscale value may be 63.5%.

The luminance compensation method of the display device of FIG. 15 may not compensate for the input image data IMG when the luminance difference between the mixed color driving and the individual color driving is not large by not generating the compensation lookup table when at least one of the mixed color crosstalks MCCT is less than or equal to the reference value.

Figure 16:
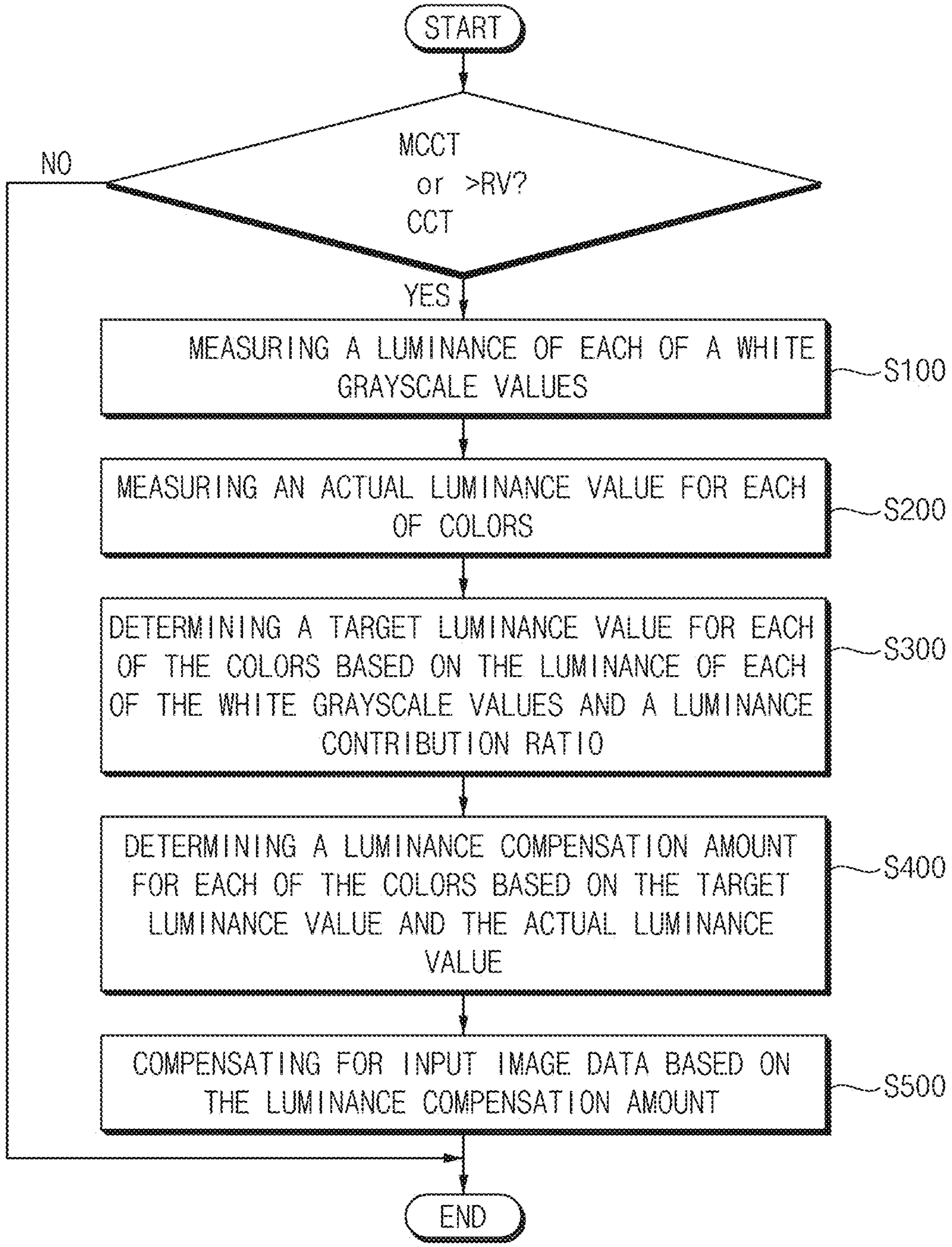
FIG. 16 is a flowchart illustrating a luminance compensation method for a display device according to embodiments of the invention.

FIG. 16 is a flowchart illustrating a luminance compensation method for a display device according to embodiments of the invention.

The luminance compensation method of FIG. 16 is substantially the same as the luminance compensation method of FIG. 1 except for generating the compensation lookup table based on the color crosstalk CCT and the mixed color crosstalk MCCT. Thus, the same reference numerals are used to refer to the same or similar element, and any repetitive detailed description thereof will be omitted.

Referring to FIGS. 2, 11, and 16, in an embodiment of the luminance compensation method, measuring the luminance of each of the white grayscale values (S100) and measuring of the actual luminance value of each of the colors (S200) may be performed when at least one of the color crosstalks CCT for the grayscale values or the mixed color crosstalks MCCT for the grayscale values is greater than the reference value.

In an embodiment, the reference value may include a first reference value for the color crosstalks CCT and a second reference value for the mixed color crosstalks MCCT. In such an embodiment, the color crosstalk CCT and the mixed color crosstalk MCCT may be compared with other reference values. measuring the luminance of each of the white grayscale values (S100) and measuring of the actual luminance value of each of the colors (S200) may be performed when at least one of the color crosstalks CCT for the grayscale values is greater than the first reference value or at least one of the mixed color crosstalks MCCT for the grayscale values is greater than the second reference value.

The luminance compensation method of the display device of FIG. 16 may not compensate for the input image data IMG when the luminance difference between the mixed color driving and the individual color driving is not large by not generating the compensation lookup table when at least one of the color crosstalks CCT and the mixed color crosstalks MCCT is less than or equal to the reference value.

Figure 17:
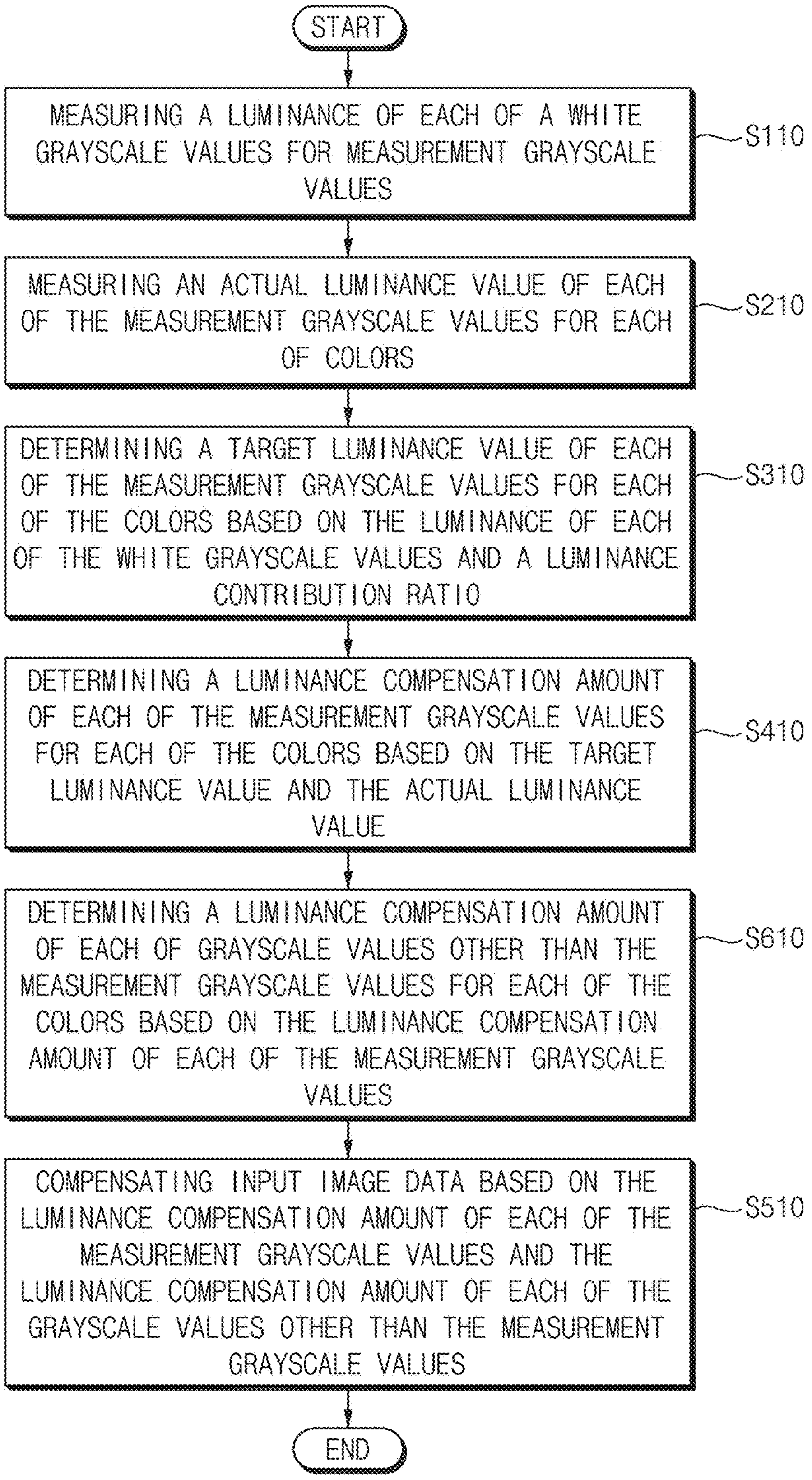
FIG. 17 is a flowchart illustrating a luminance compensation method for a display device according to embodiments of the invention.

FIG. 17 is a flowchart illustrating a luminance compensation method for a display device according to embodiments of the invention.

The luminance compensation method of FIG. 17 is substantially the same as the luminance compensation method of FIG. 1 except for measuring the luminance only in measurement grayscale values. Thus, the same reference numerals are used to refer to the same or similar element, and any repetitive detailed description thereof will be omitted.

Referring to FIG. 17, an embodiment of the luminance compensation method may include measuring the luminance of each of the white grayscale values for the measurement grayscale values (S110), measuring the actual luminance value of each of the measurement grayscale values for each of the colors (S210), determining the target luminance value of each of the measurement grayscale values for each of the colors based on the luminance of each of the white grayscale values and the luminance contribution ratio (S310), determining the luminance compensation amount of each of the measurement grayscale values for each of the colors based on the target luminance value and the actual luminance value (S410), determining the luminance compensation amount of each of the grayscale values other than the measurement grayscale values for each of the colors based on the luminance compensation amount of each of the measurement grayscale values (S610), and compensating for the input image data based on the luminance compensation amount of each of the measurement grayscale values and the luminance compensation amount of each of the grayscale values other than the measurement grayscale values (S510).

In such an embodiment, the luminance compensation method may include determining the luminance compensation amount of each of the grayscale values other than the measurement grayscale values for each of the colors based on the luminance compensation amount of each of the measurement grayscale values (S610). In an embodiment, for example, the luminance compensation amount of each of the grayscale values other than the measurement grayscale values may be determined by interpolating the luminance compensation amount of each of the measurement grayscale values.

Therefore, the luminance compensation method of FIG. 17 may reduce an amount of calculation by calculating only the luminance compensation amount in the measured grayscale values.

Figure 18:
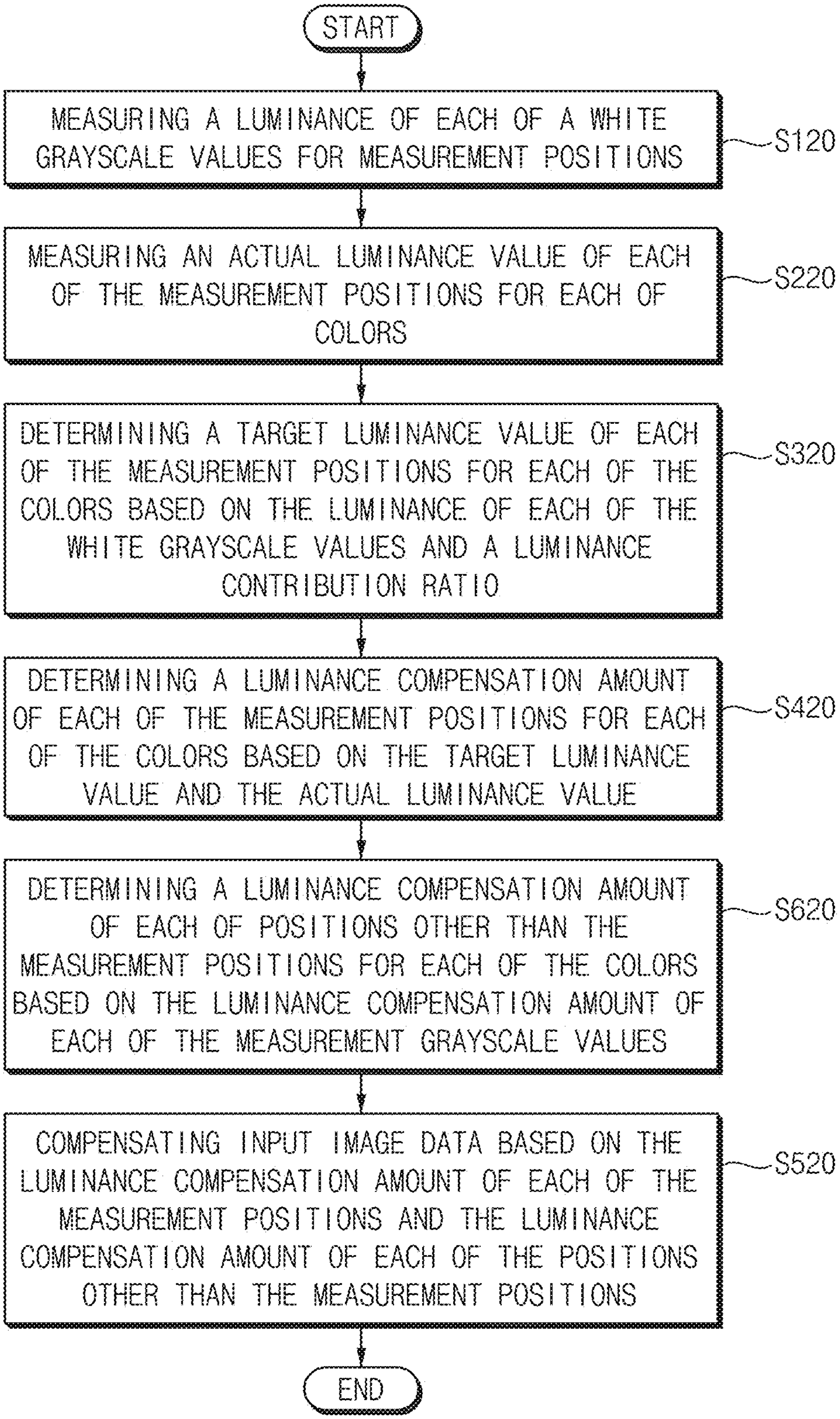
FIG. 18 is a flowchart illustrating a luminance compensation method for a display device according to embodiments of the invention.
Figure 19:
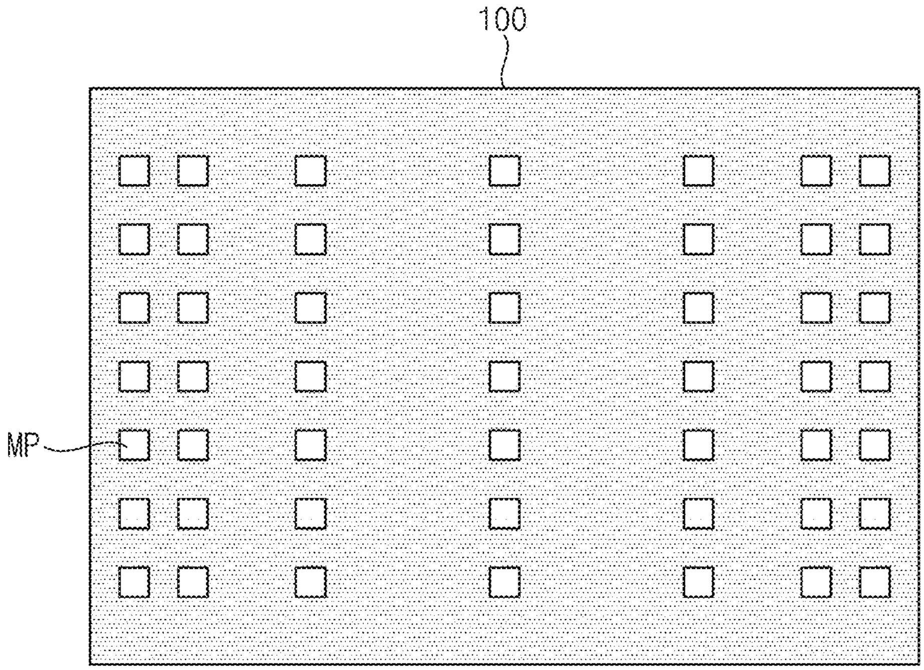
FIG. 19 is a diagram illustrating an example of measurement positions according to the luminance compensation method for the display device of FIG. 18.
Figure 20:
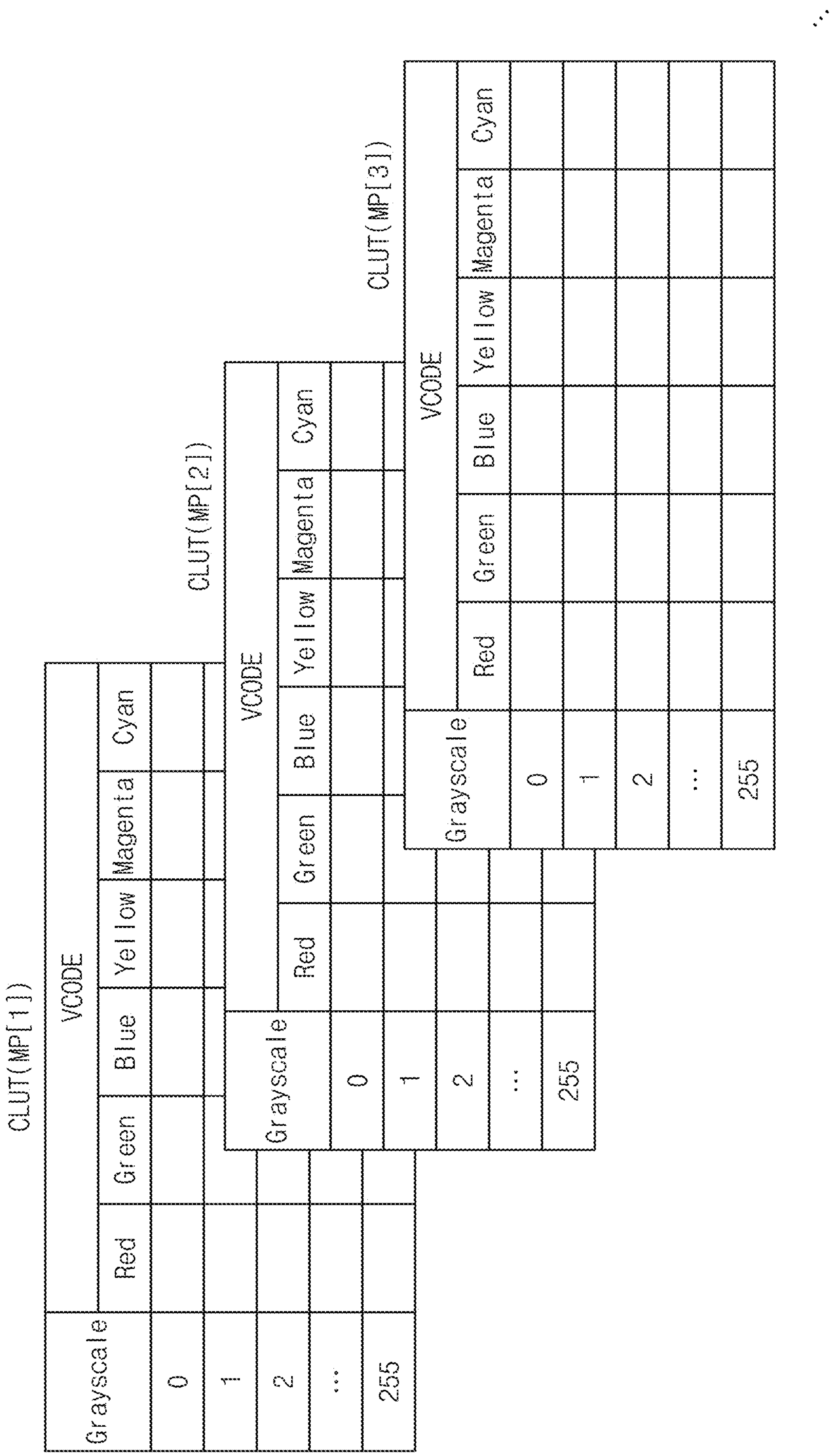
FIG. 20 is a diagram illustrating a compensation lookup table according to the luminance compensation method for the display device of FIG. 18.

FIG. 18 is a flowchart illustrating a luminance compensation method for a display device according to embodiments of the invention, FIG. 19 is a diagram illustrating an example of measurement positions MP according to the luminance compensation method for the display device of FIG. 18, and FIG. 20 is a diagram illustrating the compensation lookup table CLUT according to the luminance compensation method for the display device of FIG. 18.

The luminance compensation method of FIG. 18 is substantially the same as the luminance compensation method of FIG. 1 except for measuring the luminance only in the measurement positions MP. Thus, the same reference numerals are used to refer to the same or similar element, and any repetitive detailed description thereof will be omitted.

Referring to FIG. 18, an embodiment of the luminance compensation method may include measuring the luminance of each of the white grayscale values for the measurement positions (S120), measuring the actual luminance value of each of the measurement positions for each of the colors (S220), determining the target luminance value of each of the measurement positions for each of the colors based on the luminance of each of the white grayscale values and the luminance contribution ratio (S320), determining the luminance compensation amount of each of the measurement positions for each of the colors based on the target luminance value and the actual luminance value (S420), determining the luminance compensation amount of each of positions other than the measurement positions for each of the colors based on the luminance compensation amount of each of the measurement grayscale values (S620), and compensating for the input image data based on the luminance compensation amount of each of the measurement positions and the luminance compensation amount of each of the positions other than the measurement positions (S520).

In such an embodiment, the luminance compensation method may include determining the luminance compensation amount of each of the grayscale values other than the measurement positions MP for each of the colors based on the luminance compensation amount of each of the measurement positions MP (S610). In an embodiment, for example, the luminance compensation amount of each of the positions other than the measurement positions MP may be determined by interpolating the luminance compensation amount of each of the measurement positions MP.

In an embodiment, for example, referring to FIGS. 19 and 20, the compensation lookup table CLUT may be generated at each of the measurement positions (e.g., MP[1], MP[2], MP[3], . . . ). The luminance compensation method of FIG. 18 may compensate for the input image data IMG for all positions of the display panel 100 by using the compensation lookup table CLUT of each of the measurement positions (e.g., MP[1], MP[2], MP[3], . . . ) (i.e., interpolation).

Therefore, the luminance compensation method of FIG. 18 may reduce the luminance deviation and the color coordinate deviation between the mixed color driving and the individual color driving due to the leakage characteristics of the display panel 100 for each position of the display panel 100 by calculating the luminance compensation amount for each position of the display panel 100.

Figure 21:
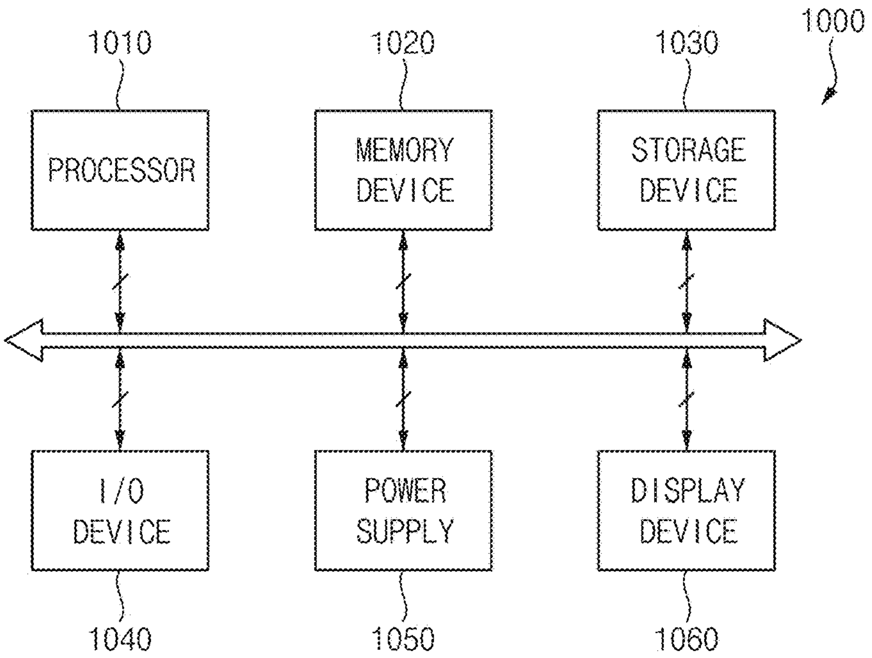
FIG. 21 is a block diagram showing an electronic device according to embodiments of the invention.
Figure 22:
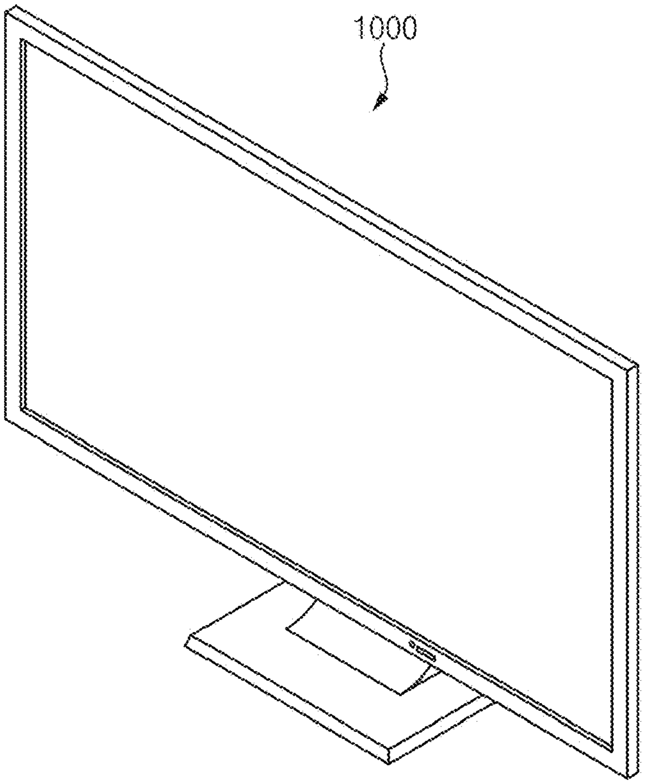
FIG. 22 is a diagram showing an embodiment in which the electronic device of FIG. 21 is implemented as a television.

FIG. 21 is a block diagram showing an electronic device according to embodiments of the invention, and FIG. 22 is a diagram showing an embodiment in which the electronic device of FIG. 21 is implemented as a television.

Referring to FIGS. 21 and 22, an embodiment of the electronic device 1000 may include a processor 1010, a memory device 1020, a storage device 1030, an input/output (I/O) device 1040, a power supply 1050, and a display device 1060. Here, the display device 1060 may be the display device of FIG. 2. In addition, the electronic device 1000 may further include a plurality of ports for communicating with a video card, a sound card, a memory card, a universal serial bus (USB) device, other electronic devices, etc. In an embodiment, as shown in FIG. 22, the electronic device 1000 may be implemented as a television. However, the electronic device 1000 is not limited thereto. In an alternative embodiment, for example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In an embodiment, for example, the display device 1060 may be an organic light emitting display device or a quantum dot light emitting display device, but is not limited thereto. The display device 1060 may be coupled to other components via the buses or other communication links. Here, the display device 1060 may reduce the luminance deviation and the color coordinate deviation between the mixed color driving and the individual color driving due to the leakage characteristics of the display panel for each position of the display panel by compensating for the input image data based on the compensation lookup table.

Embodiments of the invention may be applied to any electronic device including the display device, for example, a television (TV), a digital TV, a three-dimensional (3D) TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A luminance compensation method for a display device, the luminance compensation method comprising:

measuring a luminance of each of white grayscale values;

measuring an actual luminance value for each of colors;

determining a target luminance value for each of the colors by multiplying the luminance of each of the white grayscale values and a luminance contribution ratio of each of the colors, wherein the luminance contribution ratio of each of the colors is calculated from a gamma correction result;

determining a luminance compensation amount for each of the colors based on the target luminance value and the actual luminance value; and compensating for input image data for each of the colors based on the luminance compensation amount.

2. The luminance compensation method of claim 1, wherein the target luminance value for a red color is calculated by multiplying the luminance of each of the white grayscale values by the luminance contribution ratio of the red color, wherein the target luminance value for a green color is calculated by multiplying the luminance of each of the white grayscale values by the luminance contribution ratio of the green color, and wherein the target luminance value for a blue color is calculated by multiplying the luminance of each of the white grayscale values by the luminance contribution ratio of the blue color.

3. The luminance compensation method of claim 2, wherein the target luminance value for a yellow color is calculated by adding the target luminance value for the green color and the target luminance value for the red color, wherein the target luminance value for a magenta color is calculated by adding the target luminance value for the blue color and the target luminance value for the red color, and wherein the target luminance value for a cyan color is calculated by adding the target luminance value for the blue color and the target luminance value for the green color.

4. The luminance compensation method of claim 1, wherein the luminance compensation amount for each of the colors is calculated by subtracting the actual luminance value from the target luminance value.

5. The luminance compensation method of claim 1, wherein the compensating for the input image data comprises:

determining a compensation voltage based on the luminance compensation amount;

converting the compensation voltage into a voltage code;

generating a compensation lookup table including the voltage code; and compensating the input image data based on the compensation lookup table.

6. The luminance compensation method of claim 1, wherein the measuring the luminance of each of the white grayscale values and the measuring the actual luminance values for each of the colors are performed when at least one of color crosstalks for grayscale values is greater than a reference value.

7. The luminance compensation method of claim 6, wherein each of the color crosstalks satisfies the following equation:

$$CCT = \frac{LW - (LR + LG + LB - 2 \times LBK)}{LW} \times 100,$$

wherein

CCT denotes each of the color crosstalks,

LW denotes the luminance of each of the white grayscale values,

LR denotes a luminance of each of red grayscale values,

LG denotes a luminance of each of green grayscale values,

LB denotes a luminance of each of blue grayscale values, and

LBK denotes a luminance of a black grayscale value.

8. The luminance compensation method of claim 1, wherein the measuring the luminance of each of the white grayscale values and the measuring of the actual luminance value of each of the colors are performed when at least one of mixed color crosstalks for grayscale values is greater than a reference value.

9. The luminance compensation method of claim 8, wherein each of the mixed color crosstalks satisfies the following equation:

$$MCCT = \frac{(L(A, 0\sim255, A) - L(A, 0, A)) - (L(0, 0\sim255, 0) - L(0, 0, 0)}{L(0, 0\sim255, 0)} \times 100,$$

wherein

MCCT denotes each of the mixed color crosstalks,

L(A,0 to 255,A) denotes a luminance of each green grayscale value when the red grayscale value is A and the blue grayscale value is A, L(A,0,A) denotes a luminance when the red grayscale value is A, the blue grayscale value is A, and the green grayscale value is 0, L(0,0~255,0) denotes a luminance of the each green grayscale value when the red grayscale value is 0 and the blue grayscale value is the 0, and L(0,0,0) denotes a luminance when the red grayscale value is 0, the blue grayscale value is 0, and the green grayscale value is 0.

10. The luminance compensation method of claim 1, wherein the measuring the luminance of each of the white grayscale values and the measuring of the actual luminance value of each of the colors are performed when at least one of color crosstalks for grayscale values or mixed color crosstalks for the grayscale values is greater than a reference value.

11. A luminance compensation method for a display device, the luminance compensation method comprising:

measuring a luminance of each of white grayscale values for measurement grayscale values;

measuring an actual luminance value of each of the measurement grayscale values for each of colors;

determining a target luminance value of each of the measurement grayscale values for each of the colors by multiplying the luminance of each of the white grayscale values and a luminance contribution ratio of each of the colors, wherein the luminance contribution ratio of each of the colors is calculated from a gamma correction result;

determining a luminance compensation amount of each of the measurement grayscale values for each of the colors based on the target luminance value and the actual luminance value;

determining a luminance compensation amount of each of grayscale values other than the measurement grayscale values for each of the colors based on the luminance compensation amount of each of the measurement grayscale values; and compensating for input image data for each of the colors based on the luminance compensation amount of each of the measurement grayscale values and the luminance compensation amount of each of the grayscale values other than the measurement grayscale values.

12. The luminance compensation method of claim 11, wherein the luminance compensation amount of each of the grayscale values other than the measurement grayscale values for each of the colors is determined by interpolating the luminance compensation amount of each of the measurement grayscale values for each of the colors.

13. The luminance compensation method of claim 11, wherein the target luminance value for a red color is calculated by multiplying the luminance of each of the white grayscale values by the luminance contribution ratio of the red color, wherein the target luminance value for a green color is calculated by multiplying the luminance of each of the white grayscale values by the luminance contribution ratio of the green color, and wherein the target luminance value for a blue color is calculated by multiplying the luminance of each of the white grayscale values by the luminance contribution ratio of the blue color.

14. The luminance compensation method of claim 13, wherein the target luminance value for a yellow color is calculated by adding the target luminance value for the green color and the target luminance value for the red color, wherein the target luminance value for a magenta color is calculated by adding the target luminance value for the blue color and the target luminance value for the red color, wherein the target luminance value for a cyan color is calculated by adding the target luminance value for the blue color and the target luminance value for the green color.

15. The luminance compensation method of claim 11, wherein the luminance compensation amount is calculated by subtracting the actual luminance value from the target luminance value.

16. A luminance compensation method for a display device, the luminance compensation method comprising:

measuring a luminance of each of white grayscale values for measurement positions;

measuring an actual luminance value of each of the measurement positions for each of colors;

determining a target luminance value of each of the measurement positions for each of the colors by multiplying the luminance of each of the white grayscale values and a luminance contribution ratio of each of the colors, wherein the luminance contribution ratio of each of the colors is calculated from a gamma correction result;

determining a luminance compensation amount of each of the measurement positions for each of the colors based on the target luminance value and the actual luminance value;

determining a luminance compensation amount of each of positions other than the measurement positions for each of the colors based on the luminance compensation amount of each of the measurement grayscale values; and compensating for input image data for each of the colors based on the luminance compensation amount of each of the measurement positions and the luminance compensation amount of each of the positions other than the measurement positions.

17. The luminance compensation method of claim 16, wherein the luminance compensation amount of each of the positions other than the measurement positions for each of the colors is determined by interpolating the luminance compensation amount of each of the measurement positions for each of the colors.

18. The luminance compensation method of claim 16, wherein the target luminance value for a red color is calculated by multiplying the luminance of each of the white grayscale values by the luminance contribution ratio of the red color, wherein the target luminance value for a green color is calculated by multiplying the luminance of each of the white grayscale values by the luminance contribution ratio of the green color, and wherein the target luminance value for a blue color is calculated by multiplying the luminance of each of the white grayscale values by the luminance contribution ratio of the blue color.

19. The luminance compensation method of claim 18, wherein the target luminance value for a yellow color is calculated by adding the target luminance value for the green color and the target luminance value for the red color, wherein the target luminance value for a magenta color is calculated by adding the target luminance value for the blue color and the target luminance value for the red color, wherein the target luminance value for a cyan color is calculated by adding the target luminance value for the blue color and the target luminance value for the green color.

20. The luminance compensation method of claim 16, wherein the luminance compensation amount is calculated by subtracting the actual luminance value from the target luminance value.

* * * * *